United States Patent [19]

Roberts et al.

[11] Patent Number: 5,191,014

[45] Date of Patent: Mar. 2, 1993

[54] TEMPORARY PROTECTIVE AQUEOUS COATING COMPOSITIONS

[75] Inventors: John S. Roberts, Wokingham; John A. Cook, Slough, both of England

[73] Assignee: Imperial Chemical Industries PLC, London, England

[21] Appl. No.: 831,096

[22] Filed: Feb. 10, 1992

Related U.S. Application Data

[63] Continuation of Ser. No. 419,604, Oct. 10, 1989, abandoned.

[30] Foreign Application Priority Data

Oct. 12, 1988 [GB] United Kingdom ............... 8823883
May 16, 1989 [GB] United Kingdom ............... 8911188

[51] Int. Cl.$^5$ ............................................. C08L 33/10
[52] U.S. Cl. ................................. 524/831; 524/833; 524/555; 524/558; 524/560
[58] Field of Search ............... 524/555, 458, 460, 558, 524/560, 831, 833

[56] References Cited

U.S. PATENT DOCUMENTS 4,131,583 12/1978 Boerwinkle ..................... 524/238
4,562,226 12/1985 Coombes et al. ............... 524/458

FOREIGN PATENT DOCUMENTS 115694 8/1984 European Pat. Off. .
133210 2/1985 European Pat. Off. .
162611 11/1985 European Pat. Off. .
2158831 11/1985 United Kingdom .
2174096 10/1986 United Kingdom .

*Primary Examiner*—Joseph L. Schofer
*Assistant Examiner*—Jeffrey T. Smith
*Attorney, Agent, or Firm*—Cushman, Darby & Cushman

[57] ABSTRACT

A coating composition for providing (especially temporary protective) coatings on surfaces (especially the hydrophobic paintwork of newly finished motor vehicles) which comprises particulate copolymer dispersed in water containing less than 10 wt % of volatile organic solvent. The particulate copolymer comprises 7 to 14 wt % acrylic or methacrylic acid, 0.1 to 10 wt % hydrophilic monomer (e.g. methacrylamide) and other monomers. The coatings are transparent, abrasion resistant, tenacious yet easily removable to produce environmentally acceptable effluent.

19 Claims, No Drawings

TEMPORARY PROTECTIVE AQUEOUS COATING COMPOSITIONS

This is a continuation of application Ser. No. 07/419,604, filed on Oct. 10, 1989, now abandoned.

This invention relates to a temporary aqueous coating composition, especially a protective composition for use on hydrophobic surfaces such as for example plastics or painted surfaces and in particular the painted surfaces found on newly manufactured motor vehicles or marine craft.

Newly manufactured motor vehicles are usually provided with a temporary protective coating to reduce the risk of damage to their paintwork during storage and delivery. The protective coating is subsequently removed before the final delivery of the vehicle to a customer. A good temporary coating composition should be environmentally acceptable yet preferably able to wet a highly hydrophobic surface (such as paint) thoroughly so that when it dries, it produces a coating which is tenacious and essentially continuous. A temporary protective coating should be thick enough to protect for example paint and all temporary coatings should be thin enough to be easily removed even after storage for long periods in a warm climate. Removal of the coating should also produce an environmentally acceptable effluent. In addition, a temporary protective coating should also resist removal by non-alkaline water (especially rain). Preferably it should also be highly transparent and colourless (unless colour is deliberately required, for example, for identification purposes) and the transparency and colourlessness should not be badly affected by rain. It is highly desirable that the coating should resist the retention of dirt picked up during storage.

For many years, hydrocarbon wax has been used to provide temporary coatings (and in particular protective coatings) on newly painted vehicles. Generally the wax is first dissolved in a volatile organic solvent and the solution is sprayed onto the (usually) hydrophobic surface where the solvent evaporates leaving a wax coating which may be quite thick if required. However the use of large amounts of solvent is increasingly environmentally unacceptable and the wax coatings obtained are at best only translucent. Additionally, the wax coatings pick up and retain dirt easily. Moreover, when first applied the wax coatings are undesirably easily removable by even light abrasion yet during ageing (especially in warm climates) they become tenacious and their removal then needs the use of pressurised jets of hot water mixed with volatile organic solvent. Temperatures of 70° C and pressures of 100 bar are widely used. It is not only inconvenient to have to use such jets, but their solvent content is again environmentally undesirable and the water, solvent and removed wax combine to produce an environmentally unacceptable effluent.

The need to reduce the amount of organic solvent associated with temporary coatings has led to recent attempts to use aqueous coating compositions comprising particles of hydrocarbon wax dispersed in water with the aid of surfactants. Such compositions still only produce translucent coatings which require inconvenient methods for removal (for example pressure jets or buffing techniques) and still produce environmentally unacceptable effluents when they are removed. In addition two new problems arise. Firstly the coatings obtained have an undesirably high sensitivity to rain. Secondly, the coating compositions have only a moderate ability to wet hydrophobic surfaces which means that they are intolerant of even slightly dirty painted surfaces and so can only be safely applied to surfaces which are ultra clean.

European patent EP 0 115 694B discloses an attempt to overcome the problems associated with wax by using coating compositions comprising sterically stabilised particles of a copolymer comprising various carboxylic acids including methacrylic acid and either esters or nitriles or amides of acrylic or methacrylic acids instead of the wax. The coating compositions were sterically stabilised by means of oligomers comprising long chain hydrophilic moieties and a hydrophobic moiety, for example oligomerised methoxy polyethylene glycol methacrylate. The compositions contained conventional anionic or non-ionic surfactants (for example sodium dioctylsulphosuccinate or a condensate of nonyl phenol and ethylene oxide) and conventional thickeners which enable thicker coatings of the compositions to be applied to the surface to be protected. The copolymer was made by a copolymerisation performed in a mixture of water and a quite large amount of organic solvent needed to avoid the existence of a separate monomer phase.

Usually the mixture comprises from 30 to 70 wt. % organic solvent. Attempts to reduce this proportion of organic solvent in the final coating composition result in the formation of a viscous precipitate of presumably previously dissolved copolymer. This precipitate prevents application of the coating composition by any practicable techniques. Coating compositions containing more than 10 wt. % of volatile organic solvent contravene new legislation concerning temporary protective coatings and in practice many users insist that new coating compositions contain less than 5 wt. % volatile organic solvent. Therefore whilst the disclosure of EP 0 115 694B solves many of the problems associated with wax coating, it fails to produce an environmentally acceptable system.

British patent specification GB 2 158 831A discloses an attempt to reduce the problem of polymer precipitation met with by the compositions of EP 0 115 69B. To do this, GB 2 158 831A employs a fully soluble copolymer made by the free radical initiated solution copolymerisation of for example methyl methacrylate, butyl acrylate, methacrylic acid and methacrylamide in organic solvent to produce a solution of copolymer fully soluble in organic solvent. This solution is then treated with enough aqueous ammonia to neutralise all the methacrylic acid groups so rendering the copolymer soluble in certain mixtures of water and organic solvent. Further water is added to the system to produce an aqueous coating composition comprising the ammonium salt of the copolymer which is either fully dissolved or possibly dispersed in the mixture of water and organic solvent. However it has been found that the compositions made according to GB 2 158 831A cannot tolerate a reduction in their organic solvent contents to below about 15 wt. % for otherwise the copolymer precipitates forming an undispersed residue which cannot be realistically applied to a surface. Hence GB 2 158 831A also fails to produce an environmentally acceptable system.

An object of this invention is to provide a more environmentally acceptable aqueous coating composition containing less than 10 wt. % of volatile organic solvent which can be used to produce a temporary coating.

Accordingly this invention provides an aqueous coating composition suitable for use in the application of temporary (especially protective) coatings which composition comprises water and a dispersion of particulate water-insoluble copolymer which has a weight average molecular weight (when determined by gel permeation chromatography against a polystyrene standard) of 10000 to 200000 (preferably 11 000 to 50 000) and comprises:

i) copolymerised acrylic or methacrylic acid or a mixture of the two,
ii) copolymerised staple monomers of the type (other than those recited in (iv) below) copolymerisable with acrylic or methacrylic acid and
iii) an oligomer comprising a long chain hydrophilic moiety which moiety has a molecular weight of from 500 to 4000 and a hydrophobic moiety chemically bonded to the particulate copolymer wherein the particulate copolymer additionally comprises
iv) copolymerised hydrophilic monomer or a mixture of hydrophilic monomers chosen from methacrylamide, hydroxyethyl acrylate, hydroxyethyl methacrylate or hydroxyisopropyl methacrylate wherein
  a) based on the combined weights of copolymerised acrylic/methacrylic acid monomers, staple monomers and hydrophilic monomers, the particulate copolymer comprises 7 to 14 wt. % (preferably 7 to 12 wt. %) of acrylic acid or methacrylic acid or the mixture of the two, 0.1 to 10 wt. % (preferably at least 5 wt. %) of hydrophilic monomer and the balance is staple monomer
  b) from 1 to 10 wt. % (preferably 2 to 8 wt. %) of the total weight of the particulate copolymer is oligomer and
  c) the coating composition comprises not more than 10 wt. % (preferably 0 to 5 wt. % and usually 0.1 to 2 wt. %) of organic solvent based on the combined weights of water, organic solvent and particulate copolymer in the composition.

Even though the coating compositions of this invention contain less than 10 wt. % of organic solvent, the combined presence of copolymerised acrylic and/or methacrylic acid, copolymerised hydrophilic monomer and bonded oligomer ensure that the compositions do not suffer unwanted precipitations at ambient temperatures (for example 15° C.) and when applied to a surface and allowed to dry they produce abrasion resistant tenacious coatings even when the surface is highly hydrophobic. The coatings are usually highly transparent and colourless (unless a deliberate choice is made to colour the coating), resistant to rain and removable by gentle washing with dilute alkaline aqueous solutions to produce an environmentally acceptable effluent. The coatings can be from 3 to 100 $\mu$m thick preferably from 3 to 50 $\mu$m thick and 4 to 12 $\mu$m thick where ease of removal is especially important. (1 $\mu$m is $10^{-6}$ m.)

Any organic solvent present in the composition generally serves to enhance coalescence of the particulate copolymer and may help the coating composition to wet a surface. The organic solvent usually has a boiling point at 1 bar (absolute) of below 300° C. and preferably from 60° to 150° C. Most commonly used materials are alcoholic in nature such as aliphatic alcohols and preferably ethylene glycol monohexyl (or monobutyl) ether or di-ethyleneglycol.

At least some of the chemically bonded oligomer functions as a steric stabiliser and serves to maintain the particulate copolymer dispersed in the aqueous composition until the coating composition has been applied to a surface and begins to dry. Sufficient bonded oligomer should be present for this purpose. The long chain hydrophilic moiety is of the type found in commercially available non-ionic surfactants such as those reviewed in Volume 22 of the third edition of Kirk-Othmer's "Encyclopaedia of Chemical Technology" published in 1983 by John Wiley of New York, see pages 360 to 377 the contents of which are herein incorporated by reference. Preferably the hydrophilic moieties comprise polyoxyethylene or poly (ethylene glycol) chains.

Preferably the hydrophobic moieties comprise unsaturated carboxylates, especially acrylate or methacrylate which can bond to the particulate copolymer by copolymerisation during formation of the copolymer. A particularly preferred oligomer is methoxy poly (ethylene glycol) methacrylate having a number average molecular weight of from 1500. to 3000. Methoxy poly (ethylene glycol) methacrylate will be referred to as "MeOPegMA" for brevity.

The amount of oligomer needed can sometimes be reduced if the coating composition also contains from 2 to 10 wt. % (based on the weight of water, organic solvent and particulate copolymer) of a non-copolymerisable non-ionic surfactant. For example the composition may contain alkyl phenol ethoxylates containing from 10 to 40 ethylene oxide units in each hydrophilic chain such as the commercially available adducts of nonyl phenol and ethylene oxide. The non-ionic surfactants are reviewed in Kirk-Othmer ibid.

Preferably the number average particle size of the particles of copolymer in the composition when measured using photon correlation spectrometry should be from 50 to 2000 nm and most preferably from 150 to 750 nm.

It has been found that a good compromise between ease of removal of the coating from a substrate and good resistance to retention of picked-up dirt can be achieved if the Tg of the particulate copolymer is from 10° (preferably 20°) to 45° C. Tg (i.e. glass transition temperature) is measured by power compensation differential scanning calorimetry as described on pages 4 to 9 of the book "Thermal Characteristics of Polymeric Materials" edited by E A Turi and published in 1981 by Academic Press INC (London) Ltd, the contents of which pages are herein incorporated by reference. The calorimetry should be performed on samples which have been heated isothermally at 100° C. for 15 minutes. It should be mentioned however, that measurements of Tg are seldom accurate to more than $+-5°$ C.

Illustrative of staple monomers which conveniently undergo free radical initiated copolymerisation with acrylic or methacrylic acids are $C_1$ to $C_{12}$ alkyl esters of unsaturated aliphatic carboxylic acids such as the methyl, ethyl, butyl, iso-butyl, 2-ethyl hexyl or lauryl esters of acrylic or methacrylic acids, vinyl esters of aliphatic acids such as vinyl acetate or vinyl versatate and vinyl aromatics such as styrene and vinyl toluene which do not confer any significant water solubility on the particulate copolymer.

The preferred staple monomers are methyl methacrylate (MMA) and butyl acrylate (BA) which are preferably present in the copolymer in a weight ratio of from 0.5 to 1.2 MMA:1 BA. Copolymers used in this invention can be conveniently made by a copolymerisation process performed in water containing less than 10 wt. % (and most desirably less than 1 wt. %) of organic solvent based on the weight of water although the water usually contains non-ionic surfactant. The acrylic and/or methacrylic acid, hydrophilic monomer and copolymerisable oligomer are dissolved in the water whereas co-monomers such as methyl methacrylate and butyl acrylate which are only sparingly soluble in water are dispersed in the water as an emulsion by means of the surfactant. Copolymerisation is preferably initiated by a water-soluble redox system such as L-ascorbic acid and hydrogen peroxide. Molecular weight may be modified by the use of conventional chain transfer agents such as mercaptans. An important advantage arising from the use of copolymerisation processes of this type is that very little water-soluble copolymer by-product is produced and as a result the compositions of this invention may comprise as little as 0 to 5 wt. % (usually 0.1 to 3 wt. %) of water-soluble by-product copolymer based on the combined weight of water, particulate copolymer and water soluble copolymer. In general any water-soluble copolymer will contain larger amounts of copolymerised acid and usually the water-soluble copolymer will comprise at least 30 wt. % (and often 40 to 70 wt. %) of copolymerised acrylic and/or methacrylic acid with the balance being copolymerised staple monomers. The percentages are based on the total weight of the water soluble copolymer.

A more uniform particle size distribution can be obtained if the copolymerisation is preceded by a short pre-polymerisation in which one or more soluble co-monomers is preceded by a short pre-polymerisation in which one or more sparingly soluble co-monomers are polymerised in the absence of acid and hydrophilic monomer. The pre-polymerisation produces polymer or copolymer seeds onto which the products of the main copolymerisation can form. Preferably from 5 to 15 wt. % of the particulate copolymer should be formed during the prepolymerisation.

The copolymerisation process produces a copolymer dispersion which is usually subsequently adjusted by for example the addition of more water and/or volatile organic solvent to make up the final coating composition. The composition may also contain various other ingredients used conventionally in aqueous coating compositions such as auxiliary ionic surfactants, light stabilisers, corrosion inhibitors, antifoaming agents, dyes pigments (if a coloured coating is wanted) and compounds known as "builders" to the detergent trade and which promote the action of surfactants. It is particularly useful to add thickeners (especially associative thickeners) to the coating composition. A discussion of suitable thickeners is given in Chapter 10 of the third edition of the book "Introduction to Paint Chemistry and Principles of Paint Technology" by GPA Turner published in 1988 by Chapman and Hall of London. The contents of the chapter are herein incorporated by reference.

If desirable, some water may be removed to produce a concentrate which is cheaper to transport but which can be converted to a coating composition by making the adjustments described above. Preferably a coating composition comprises from 5 to 30 wt. % of solid material (based on the total weight of the coating composition but exclusive of any pigment). However, application is usually easier if the composition comprises from 10 to 20 wt. % of solid material (exclusive of pigment). A concentrate may contain from 30 to 50 wt. % of solid material again exclusive of any pigment. It has recently been discovered that the coating compositions according to this invention are tolerant of neutralisation by cations especially aqueous ammonia or sodium or other Group 1 metal alkaline compounds and so if required (for example to minimise the risk of corrosion of metal work) the pH of the compositions can be raised, for example to 7 or even up to 10.

The invention further provides a method for providing a temporary coating on a surface which method comprises applying (usually spraying) a temporary aqueous coating composition according to this invention onto the surface to provide a coating on the surface preferably in an amount such that when the coating dries it has a thickness of from 3 to 40 (preferably 5 to 10) $\mu$m. (1 $\mu$m is $10^{-6}$m).

For the purposes of this invention, the ease of removal of a temporary protective coating by dilute alkali is assessed by means of the "Alkaline Removal Test" described below. Likewise the resistance of the coating to removal by non-alkaline water such as rain and the resistance of the coating to the retention of picked-up dirt are assessed by the "Water Resistance Test" and the "Dirt Retention Test" respectively described below.

1. Alkaline Removal Test

The coating composition to be tested is sprayed onto a flat panel onto which a conventional stoved acrylic motor car paint has been recently applied. "Recently" means that the paint should be less than two days old reckoned from the completion of stoving. Sufficient coating composition is used to produce a dry coating of from 4 to 12$\mu$m thick. The sprayed panel is either allowed to dry for two hours at either 25° C. or 50° C. or alternatively dried and aged by subjecting the panel to a temperature of 100° C. which simulates the effects of storage in a hot climate.

The dry temporarily coated panel is then mounted horizontally and the first of 30 drops each of 0.1 to 0.2 mls of a dilute alkali composition is deposited onto a portion of the coated panel. The dilute alkali is alkaline water of pH 12 to 12.5 containing surfactant and thickener and may be for example the removal fluid sold as "Belpro" 70 or "Tempro" 70 by Imperial Chemical Industries PLC. Half a minute later, the second drop is deposited onto a second portion of the coated panel adjacent to the first portion but spaced from it by at least 1.5 mm. A further 28 drops are likewise deposited at half minute intervals onto similarly spaced portions of the coated panel so that by the time that the last drop has been deposited, a series of 30 portions will have been produced each of which has been in contact with the alkali for a different period of time within the range 0 to 15 minutes inclusive. The actual period of contact will depend on the position occupied by the drop in the series of 30. For example the portion on which the twentieth drop is deposited will have been in contact with the alkali for 5 minutes by the time the las drop is deposited.

Immediately after deposition of the thirtieth drop, the panel is rinsed with cold water and dried using compressed air. The various portions of panel are then examined usually to see from which (if any) the coating has been totally removed. Of the portions showing total removal, the portion which received its drop most recently is noted and the time that portion was in contact with the alkali is recorded as the minimum removal time needed for total removal of the temporary coating. This minimum removal time is a measure of the ease with which the temporary protective coating can be removed by washing with dilute alkali.

2. Water Resistance Test

This test assesses the ability of the temporary coating to resist damage or removal by non-alkaline water such as rain.

A coated test panel is prepared as in Test 1 above and allowed to dry for two hours at 25° C. The dried coated panel is then immersed in tap water for two hours at 20° C. At the end of the two hours, the panel is removed from the tap water and immediately inspected for sign of damage or removal of the coating. The result is judged according to the following scale:

| Result | Water Resistance |
| --- | --- |
| 1. No visible effect | Very Good |
| 2. Microblistering | Good |
| 3. Whitening | Acceptable |
| 4. Blistering | Poor |
| 5. Total or partial removal of the coating | Bad |

3. Dirt Retention Test

This test assesses the tendency of the coating to retain dirt.

Fine powder containing a high concentration of calcium carbonate and calcium bicarbonate is sprinkled onto a coated panel prepared according to Test 2 above. The sprinkled panel is allowed to stand for five minutes and then any loose powder is shaken off. The panel is then maintained at a specified temperature (which may be from 20° to 50° C.) for 24 hours. Dirt retention is then assessed by rinsing the coating with turbulent water and then gently wiping with a damp cloth.

The invention is further illustrated by the following Examples which all employ commercial grade monomers. The following abbreviations are used in the Examples

| MMA | Methyl Methacrylate |
| --- | --- |
| BA | Butyl Acrylate |
| MAA | Methacrylic Acid |
| MAAM | Methacrylamide |
| MeOPegMA | Methoxy poly(ethylene glycol) methacrylate |

Also in the Examples, the weight percentages quoted for methacrylic acid, staple monomers (i.e. methyl methacrylate and butyl acrylate) and hydrophilic monomers are based on the combined weight of acid, staple monomer and hydrophilic monomer in the copolymer. In contrast, the weight percentages quoted for MeOPegMA are based on the total weight of the copolymer.

EXAMPLE 1

Preparation of a Dispersion of Seeded Copolymer

This Example illustrates a general method for making a dispersion containing seeded copolymer. The dispersion is suitable for dilution and optionally mixing with other ingredients to make a temporary protective coating composition according to this invention.

Firstly a seed copolymer was formed by adding a mixture consisting of methyl methacrylate, butyl acrylate and p-octyl mercaptan (in amounts shown is Table 1) to 332g of de-ionised water containing 5.9 g of a simple non-copolymerisable non-ionic surfactant which was the adduct of nonyl phenol and ethylene oxide available from Imperial Chemical Industries PLC under the trade name "Synperonic" NP20/80.

TABLE 1

| MMA | BA | *p octyl mercaptan |
| --- | --- | --- |
| 17 g | 27 g | 0.5 g |

*chain transfer agent

After completion of the addition, the mixture obtained was stirred at 40° C. for 15 minutes under nitrogen. Then a solution of 0.15 g L-ascorbic acid in 7 g de-ionised water and a solution of 1.4 g of 20 volume hydrogen peroxide in 7 g of de-ionised water were added to the stirred mixture as a redox initiator. The mixture was maintained at 40° C. and stirred for a further 60 minutes. A water insoluble seed copolymer of methyl methacrylate and butyl acrylate was formed which existed as a dispersion of fine particles. This dispersion of seed copolymer was maintained at 40° C. and used to produce the precursor dispersion as follows:

A copolymerisation mixture was made by adding 41.2 g of methacrylamide to 45.8 g of methacrylic acid and stirring . Then 153.4 g of methyl methacrylate was added to the acid/amide mixture with stirring followed by 240.6 g butyl acrylate again with stirring. 4.8 g of p.octyl mercaptan was stirred into the above monomer mixture and then the mixture was added to 321g of de-ionised water containing 25 g of "Synperonic" NP 20/80 and 39 g of methoxy polyethylene glycol methacrylate (number average molecular weight 2000) dissolved in 39 g of a 3:1 mixture of deionised water and propylene glycol.

This copolymerisation mixture was then added to the dispersion of seed copolymer over a period of 200 minutes together with a solution of 1.4g of L-ascorbic acid in 98.6 g of de-ionised water and a solution of 14.3 g of 20 volume hydrogen peroxide in 85.7 g de-ionised water which together form a redox initiator system. During the addition the dispersion was maintained at 40° C. under nitrogen and was stirred continually. Heating and stirring under nitrogen were continued for a further 60 minutes after addition of the emulsion had been completed. A dispersion of a water insoluble particulate copolymer was obtained which had the composition shown in Table 2.

TABLE 2

| Copolymer | Copolymer Composition wt % | | | | wt % |
| --- | --- | --- | --- | --- | --- |
| | MMA | BA | MAA | MAAM | MeOPgMA |
| 1 | 32.5 | 51 | 8.75 | 7.75 | 7.5 |

The number average particle size was 163 nm. The dispersion also contained from 2 to 3 wt. % of a dissolved copolymer of these co-monomers containing about 50 wt. % of copolymerised methacrylic acid. The dispersion was suitable for use in a coating composition according to this invention. The particulate copolymer had a Tg of 40° C. and a weight average molecular weight of about 22000. The dispersion contained 36.5 wt. % of solid material.

EXAMPLE 2

Importance of the Hydrophylic Comonomer (e.g. Methacrylamide)

Example 2 illustrates that in order to achieve acceptable removal of the temporary protective coating by dilute alkali, it is necessary for the copolymer to contain hydrophilic comonomer.

Copolymer dispersions were made according to the procedure of Example 1 except that for copolymers other than Copolymer 1, the amounts of comonomers, MeOPegMA and mercaptan used were adjusted so as to produce copolymer compositions as shown in Table 3.

TABLE 3

| Copol. | Copol. Co pn Wt % | | | | Wt % MeO/PegMA | Mol Wt ×10.3 | Part. size nm | Tg °C. |
|---|---|---|---|---|---|---|---|---|
| | MMA | BA | MAA | MAAM | | | | |
| A | 56 | 34 | 10 | 0 | 7.5 | 27 | 199 | 34 |
| 2 | 38.6 | 50.9 | 10.2 | 0.3 | 7.5 | 29 | 139 | 38 |
| 3 | 39 | 48 | 10 | 3 | 7.5 | 25 | 155 | 16 |
| 4 | 38 | 47 | 10 | 5 | 5 | 30 | 145 | 27 |
| 5 | 37.4 | 46 | 11 | 5.5 | 7.5 | 40 | 100 | 23 |
| 6 | 37 | 43 | 14 | 6 | 7.5 | 25 | 209 | 44 |
| 1 | 32.5 | 51 | 8.75 | 7.75 | 7.5 | 22 | 163 | 40 |
| 7 | 32 | 48 | 10 | 10 | 5 | 24 | 179 | 28 |

The copolymer dispersions were each in turn converted to a temporary coating composition by diluting with water and mixing with other ingredients as follows:

In the case of Copolymer 5, 41.1 g of the dispersion of seeded copolymer obtained by the adjusted procedure of Example 1 and which contained 36.5 wt. % of the seeded copolymer was mixed with either Mixture a or Mixture b below. Mixing was performed by adding both components to a mixing vessel and stirring for 5 minutes.

| Mixture a | Mixture b |
|---|---|
| 860 g de-ionised water | 784 g de-ionised water |
| 278 g of a mixture comprising 10 wt % *"Primal" RM8 and 90 wt % de-ionised water | 278 g of a mixture comprising 10 wt % *"Primal" RM8 and 90 wt % de-ionised water |
| 20 g *"Synperonic" NP8 | 10 g of a mixture comprising 10 wt % *FC135 and 90% water |
| 20 g *Hexyl "Cellosolve" | 16 g *Hexyl "Cellosolve" |

*"Primal" RM8 is an associative thickener supplied by Rohn and Haas and which comprises 35 wt % thickener, 26 wt % propylene glycol and 49% water.
*FC135 is a fluorinated quaternary ammonium cationic surfactant supplied by the 3M Company.
*"Synperonic" NP8 is an alternative adduct of nonyl phenol and ethylene oxide available from Imperial Chemical Industries PLC.
*Hexyl "Cellosolve" is ethylene glycol monohexyl ether.

Both Mixtures a and b produced temporary protective coating compositions which contained 1.2 wt. % of organic solvent.

In the case of Copolymers 1 to 4, 6, 7 and Comparative Copolymer A, the coating compositions were made by what will be referred to as the "standard procedure" which is as follows:

"Primal" RM8 was first diluted with de-ionised water to produce a mixture which comprised only 16 wt. % thickener and .7.3 wt. % propylene glycol. The coating composition was then made up by mixing together de-ionised water, the diluted "Primal" RM8, hexyl "Cellosolve" and the relevant precursor dispersion made according to the procedure or adjusted procedure of Example 1 in proportions such that the composition obtained comprised:

1.4 wt. % diluted "Primal" RM8
1.0 wt. % hexyl "Cellosolve"
15.0 wt. % seeded copolymer
Balance de-ionised water The coating compositions obtained from Copolymer 5 using Mixtures a and b were each in turn fed to a conventional spray gun of the type used in providing temporary protective coatings on motor cars and set for use with low viscosity liquids. The compositions were sprayed at ambient temperature (15° to 20° C.) onto the hydrophobic paintwork of a newly manufactured motor car where they wetted the surface and produced a coating which when it had dried had a thickness of from 5 to 10 μm. Such coatings provided tenacious abrasion resistant protection for the paint yet could be easily removed to produce environmentally acceptable effluent by one application of alkaline aqueous solution of pH 10 to 12.5 such as "Remover" UL 6000 supplied by Hanson-Loran Chemical Company Incorporated (pH 10) or such as the removing fluid sold by Imperial Chemical Industries PLC under the trade names "Belpro" 70 or "Tempro" 70 (pH 12.3).

Removal was possible even after the protected vehicle had been kept for long periods in hot conditions. The coating was highly transparent and colourless, was scarcely affected by rain water and was very resistant to picking up dirt.

The coating compositions obtained from Copolymers 1 to 4, 6, 7 and Comparative Example A were sprayed onto panels by what will be referred to as the "Standard Technique". In the Standard Technique each coating composition is in turn fed to a conventional spray gun of the type used in providing temporary protective coatings on motor cars and set for use with low viscosity liquids. The compositions were sprayed at ambient temperature (15° to 20° C.) onto flat panels coated with a fully stoved acrylic paint of the type used to paint motor cars where they wetted the hydrophobic surface of the paint and produced coatings which when they had dried had thicknesses as given in Table 4. The stoved paint was less than two days old. The panels were then subjected to the Alkaline Removal Test in pairs, one member of a pair being allowed to dry at 50° C. and the other being dried and aged at 100° C. The minimum removal times achieved are shown in Table 4.

TABLE 4

| Copol. | wt % MAAM | Coating Thickness μm | Minimum Removal Times, mins | |
|---|---|---|---|---|
| | | | After drying at 50° C. | After drying, ageing 100° C. |
| A | 0 | 4 | >15 | >15 |
| 2 | 0.3 | 4 to 12 | 1 | >15 |
| 3 | 3 | 4 to 12 | 1 | >15 |

TABLE 4-continued

| Copol. | wt % MAAM | Coating Thickness μm | Minimum Removal Times, mins | |
|---|---|---|---|---|
| | | | After drying at 50° C. | After drying, ageing 100° C. |
| 4 | 5 | 7 | 1 | 1 |
| 6 | 6 | 4 to 12 | 1 | 1 |
| 1 | 7.75 | 4 to 12 | 1 | 1 |
| 7 | 10 | 5 | 0.5 | 0.5 |

Table 4 shows that the presence of methacrylamide is necessary in order to obtain removal of the temporary protective coating by dilute alkali within a period of one minute and preferably the proportion of methacrylamide should be at least 5 wt. % in order to permit rapid removal of aged coatings. It has been found that when the proportion of methacrylamide exceeds 10 wt. %, the coatings begin to become vulnerable to damage by non-alkaline water.

EXAMPLE 3

Importance of the Acidic Comonomer (e.g. Methacrylic Acid)

Example 3 illustrates that in order to achieve acceptable removal of the temporary protective coating by dilute alkali it is necessary for the copolymer to contain at least 6 wt. % of acid comonomer. In contrast, if the coating is to avoid unacceptable damage by non-alkaline water, it should not contain more than 14 wt. % acid comonomer.

Temporary coating compositions were made from Copolymer 5 with Mixtures a and b as already described in Example 2 and from Comparative Copolymers B, C and D using the Standard Procedure described in Example 2.

The compositions of the Copolymers are shown in Table 5. The coating compositions obtained from Copolymer 5 were each applied to a motor car as already described in Example 2 and the coating compositions obtained from Copolymers 1, 3, 5, 6 and Comparative copolymers B, C and D were applied to pairs of panels using the Standard Technique of Example 2 except that one of each pair of coated panels was allowed to dry at 25° C. instead of 50° C.

TABLE 5

| Copol. | Copol. comp. wt % | | | | Wt % MeO/PegMA | Mol wt ×10⁻³ | Part. size nm | Tg °C. |
|---|---|---|---|---|---|---|---|---|
| | MMA | BA | MAA | MAAM | | | | |
| B | 49 | 41 | 0 | 10 | 5 | — | 168 | 18 |
| 1 | 32.5 | 51 | 8.75 | 7.75 | 7.5 | 22 | 163 | 40 |
| 4 | 38 | 47 | 10 | 5 | 5 | 30 | 145 | 27 |
| 5 | 37.4 | 46 | 11 | 5.5 | 7.5 | 40 | 100 | 23 |
| 6 | 37 | 43 | 14 | 6 | 7.5 | 25 | 209 | 44 |
| C | 52 | 33 | 15 | 0 | 7.5 | — | 459 | 40 |
| D | 44 | 36 | 20 | 0 | 5 | 26 | 638 | 46 |

The coatings when dried had thicknesses as shown in Table 6. These coatings were subjected to the Alkaline Removal Test and the Water Resistance Test and the results obtained are also shown in Table 6.

TABLE 6

| Copol | wt % MAA | Coating Thickness nm | Min. Removal Times mins | | Water Resistance |
|---|---|---|---|---|---|
| | | | Drying at 25° C. | Drying and ageing at 100° C. | |
| B | — | 4 to 12 | >15 | >15 | Good |
| 1 | 8.75 | 4 to 12 | 1 | 1 | Good |
| 4 | 10 | 4 to 12 | 1 | 1 | Good |
| 5 | 11 | 5 to 12 | Good | Good | Good |
| 6 | 14 | 4 to 12 | 1 | 1 | Good |
| C | 15 | 6 | 0.5 | 1 | Poor |
| D | 20 | 4 | 0.25 | 1 | Poor |

Table 6 shows that acidic comonomer is needed to achieve acceptable removal by dilute alkali whereas if the acidic comonomer exceeds 14 wt. %, the coating composition is easily damaged by non-alkaline water even when the copolymer does not contain methacrylamide. (Methacrylamide promotes damage by non-alkaline water).

EXAMPLE 4

Importance of Oligomer (e.g. Methoxy Polyethylene Glycol Methacrylate, MeOPegMA).

Copolymers 8 to 12 and Comparative Copolymer E were made according to the general procedure of Example 1 adjusted such that the copolymers comprised 38 wt. % MMA, 47 wt. % BA, 10 wt. % MAA and 5 wt. % MAAM plus various amounts of methoxy polyethylene glycol methacrylate as shown in Table 7.

TABLE 7

| Copol. | Mol wt ×10⁻³ | Particle size nm | Tg °C. | wt %* MeOPegMA |
|---|---|---|---|---|
| E | 26 | 189 | 25 | 0 |
| 8 | 24 | 199 | 25 | 2 |
| 9 | 25 | 145 | 38 | 3.75 |
| 10 | 27 | 174 | 27 | 5 |
| 11 | 22 | 162 | 35 | 7.5 |
| *12 | 25 | 167 | 15 | 3.5 |

*MeO PE Glycol MA moieties had a weight average molecular weight of 2000 in Copolymers E and 8 to 11 and of 1000 in Copolymer 12.

The copolymers were made up into coating compositions using the Standard Procedure of Example 2. Then the coating compositions (except for that based on Comparative Copolymer E) were each in turn successfully applied to panels using the Standard Technique of Example 2. The coating composition based on Copolymer E separated into two phases and could not be satisfactorily applied to a panel. Each coated panel was subjected to either the "Water Resistance Test" or The "Alkaline Removal Test" using drying at 25° C. The results obtained are shown in Table 8.

TABLE 8

| Copol. | wt % MeO PegMA | Coating Thickness μm | Water Resistance or other comment |
|---|---|---|---|
| E | 0 | — | Coating composition |

TABLE 8-continued

| Copol. | wt % MeO PegMA | Coating Thickness μm | Water Resistance or other comment |
|---|---|---|---|
| | | | suffered phase separation |
| 8 | 2 | 7 | Acceptable |
| 9 | 3.75 | 11 | Good |
| 10 | 5 | 7 | Very Good |
| 11 | 7.5 | 9 | Acceptable |
| 12 | 3.5 | 9 | Good |

Table 8 shows that the best water resistance occurs when the amount of MeOPegMA is from 2 to 7.5 wt. %. The water resistance of the coatings becomes bad if the amount of MeOPegMA exceeds 10 wt. %. Importance of Molecular Weight:

EXAMPLE 5

Importance of Molecular Weight

Copolymers 13 to 16 were made according to the general procedure of Example 1 adjusted such that the copolymers comprised 38 wt. % MMA, 47 wt. % BA, 10 wt. % MAA and 5 wt. % MAAM and various amounts of MeOPegMA as shown in Table 9. The amount of mercaptan used was also adjusted so as to obtain the various weight average molecular weights also shown in Table 9.

TABLE 9

| Copol. | Mol wt $\times 10^{-3}$ | *wt % Mercaptan used | Part. size nm | Tg °C. | wt % MeOPegMA |
|---|---|---|---|---|---|
| 13 | 12 | 2 | 184 | 20 | 5 |
| 14 | 18 | 1.5 | 185 | 39 | 7.5 |
| 15 | 37 | 0.15 | 150 | 18 | 7.5 |
| 16 | 172 | 0.08 | 174 | 26 | 5 |

*wt % based on total weight of monomers fed to the copolymerisation after formation of the seed copolymer.

The copolymers obtained were made up into coating compositions using the Standard Procedure of Example 2 and applied to panels using the Standard Technique of Example 2. The panels were subjected to the Alkaline Removal Test and the results obtained are shown in Table 10.

TABLE 10

| | | | Min. Removal Times mins. | |
|---|---|---|---|---|
| Copol. | Mol wt $\times 0^{-3}$ | Coating Thickness μm | After drying at 25° C. | After drying and ageing at 100° C. |
| 13 | 12 | 5 | 1 | 1 |
| 14 | 18 | 9 | 0.5 | 0.5 |
| 15 | 37 | 8 | 1.5 | 3 |
| 16 | 172 | 4 | 3 | >15 |

Table 10 shows that the quickest removal of the temporary protective coatings occurs when the weight average molecular weight of the copolymer is from 12,000 to 37,000.

EXAMPLE 6

Importance of Glass Transition Temperature (Tg)

Copolymers 13,15, 17 and Comparative Copolymers F and G were made according to the general procedure of Example 1 adjusted so that the Copolymers (except for F and G) comprised 38 wt. % MMA, 47 wt. % BA, 10 wt. % MAA, 5 wt. % MAAM and various amounts of MeOPegMA as specified in Table 11. Comparative copolymers F and G had the following weight compositions

| | MMA | BA | MAA | MAAM |
|---|---|---|---|---|
| F | 21 | 64 | 10 | 5 |
| G | 60 | 25 | 10 | 5 | together with the amounts of MeOPegMA shown in Table 11.

TABLE 11

| Copol. | Tg °C. | Mol wt $\times 10^{-3}$ | Part. size nm | wt % MeOPegMA |
|---|---|---|---|---|
| F | 5 | 27 | 192 | 5 |
| 15 | 18 | 37 | 150 | 5 |
| 13 | 20 | 12 | 184 | 5 |
| 17 | 45 | 27 | 131 | 3 |
| G | 50 | 21 | 467 | 5 |

The copolymers obtained were made up into coating compositions using the Standard Procedure of Example 2 and each composition was in turn applied to panels using the Standard Technique of Example 2. The panels (except that coated with copolymer G) were then subjected to the "Dirt Retention Test" and the results are shown in Table 12.

TABLE 12

| Copol. | Tg °C. | Coating Thickness μm | Dirt Retention or other comment |
|---|---|---|---|
| F | 5 | 27 | Dirt retained |
| 15 | 18 | 37 | Dirt removed |
| 13 | 20 | 12 | Dirt removed |
| 17 | 45 | 27 | Dirt removed |
| G | 50 | 21 | Coating not adhered to panel |

The coating obtained using the coating composition containing Comparative Copolymer G did not adhere properly to the panel and could not be tested for dirt retention.

Table 12 shows that a Tg of as low as 5° C. causes coatings to retain picked-up dirt whereas a Tg as high as 50° C. prevents the particles from coalescing whereupon they do not adhere strongly to the panel.

EXAMPLE 7

Alternative Hydrophilic Comonomers

Copolymers 18, 19 and 20 were made according to the general procedure of Example 1 using various alternative hydrophilic comonomers (as specified in Table 13) instead of MAAM and with adjustments such that the copolymers obtained comprised 38 wt. % MMA, 47 wt. % BA, 10 wt. % MAA, 5 wt. % hydrophilic comonomer and 5 wt. % MeOPegMA. The copolymers were made up into coating compositions using the Standard Procedure of Example 2 and applied to panels using the Standard Technique of Example 2.

TABLE 13

| Copol. | *Hydrophilic Comonomer | Mol wt $\times 10^{-3}$ | Part. size nm | Tg °C. |
|---|---|---|---|---|
| 18 | HEMA | 21 | 184 | 15 |
| 19 | HIPMA | 24 | 136 | 14 |
| 20 | HEA | 27 | 258 | 16 |

*HEMA is hydroxyethyl methacrylate
HIPMA is hydroxyisopropyl methacrylate
HEA is hydroxyethyl acrylate Then the coated panels were subjected to either the Alkaline Removal Test or the Water Resistance Test and the results obtained are shown in Table 14.

TABLE 14

| Copol. | Hydrophilic Comonomer | Coating Thick. μm | Min. Removal Times mins Drying at 25° C. | Dry + age 100° C. | Water resistance |
|---|---|---|---|---|---|
| 18 | HEMA | 10 | 1 | 1 | Good |
| 19 | HIPMA | 12 | 0.5 | 4 | Good |
| 20 | HEA | 8 | 0.5 | 7 | Poor |

Table 14 shows that as a possible alternative to MAAM, HEMA has a clearly inferior ability to be removed by dilute alkali but could be acceptable where speed of removal is not important. HIPMA has a clearly inferior ability to be removed after ageing at 100° C. but is as good as MAAM when not aged and so could be useful where motor cars are not stored in hot climates. HEA has a poor ability to be removed after ageing and a poor water resistance but would be useful in cold, dry climates.

EXAMPLE 8

Usefulness of Neutralisation

This Example illustrates that neutralised coating compositions according to this invention can be used on extremely hydrophobic surfaces such as newly stoved motor car paint which has been polished with a silicone wax.

A coating composition was made up by adding the following ingredients to a mixing vessel and stirring for 5 minutes:

| INGREDIENT | PARTS BY WEIGHT |
|---|---|
| Copolymer Dispersion obtained from Example 1 | 38.7 |
| "Primal" RM8 diluted with de-ionised water to produce a solution containing 16 wt % thickener | 1.4 |
| FC 135 | 0.1 |
| Hexyl "Cellosolve" | 0.73 |
| De-ionised water | 59.07 |

The coating composition was applied using the Standard Technique of Example 2 to a panel coated with recently stoved paint and also to a similarly painted panel which had been polished with a conventional motor car silicone wax polish. The coating composition satisfactorily wetted the unpolished panel but would not wet the polished panel.

The coating composition was re-made but with the addition of 1 part by weight of 0.88 ammonia which neutralised acid groups in the copolymer. The composition was then applied as before to unpolished and silicone wax polished painted panels and this time it was found that the composition satisfactorily wetted both the unpolished and the polished panels.

Similar results can be obtained if the copolymer is neutralised by Group 1 metal ions and in particular by sodium metal ions.

What we claim is:

1. An aqueous coating composition suitable for use in the application of temporary coatings which composition comprises water and a dispersion of particulate water-insoluble copolymer which has a weight average molecular weight of 10 000 to 200 000 and which is a copolymer of
   (i) methacrylamide;
   (ii) acrylic or methacrylic acid or a mixture of the two; and
   (iii) a staple monomer other than those recited in (i) and (ii) which is copolymerisable with acrylic or methacrylic acid by free radical initiated copolymerization but which does not confer water solubility on the copolymer; and an oligomer chemically bonded to said copolymer, said oligomer comprising a long chain hydrophilic moiety which moiety has a molecular weight of from 500 to 4000 and a hydrophobic moiety through which the oligomer is chemically bonded to the particulate copolymer and wherein
   a) based on the combined weights of the monomers (i), (ii) and (iii), the particulate copolymer comprises 7 to 14 wt. % of acrylic acid or methacrylic acid or the mixture of the two, 0.1 to 10 wt. % of methyacrylamide and the balance is staple monomer,
   b) from 1 to 10 wt. % of the total weight of the particulate copolymer is oligomer and
   c) the coating composition comprises not more than 5 wt. % of organic solvent based on the combined weight of water, organic solvent and particulate copolymer in the composition.

2. An aqueous coating composition according to claim 1 wherein the particulate copolymer has been made by a copolymerisation performed in water containing less than 10 wt. % of organic solvent based on the weight of water.

3. An aqueous coating composition according to claim 1 or wherein the particulate copolymer has a glass transition temperature (Tg) of from 10° to 45° C.

4. An aqueous coating composition according to claim 1 wherein the particulate copolymer has a weight average molecular weight of from 11,000 to 50,000.

5. An aqueous coating composition according to claim 1 wherein the particulate copolymer comprises from 7 to 12 wt. % of acrylic acid or methacrylic acid or the mixture of the two based on the combined weights of copolymerised acid, staple monomer and methacrylamide.

6. An aqueous coating composition according to claim 1 wherein the particulate copolymer comprises at least 5 wt. % of metacrylamide based on the combined weights of copolymerised acid, staple monomer and methacrylamide.

7. An aqueous coating composition according to claim 1 wherein the particulate copolymer comprises 2 to 8 wt. % of oligomer based on the total weight of the copolymer.

8. An aqueous coating composition according to claim 1 wherein the oligomer comprises polyoxyethylene or poly(ethylene glycol) chains.

9. An aqueous coating composition according to claim 1 wherein from 5 to 15 wt. % of the particulate copolymer (based on the total weight of the particulate copolymer is formed during a pre-polymerisation performed in the absence of acid or hydrophilic monomers.

10. An aqueous coating composition according to claim 1 wherein the composition comprises less than 5 wt. % of water-soluble by-product copolymer based on the combined weight of water, particulate copolymer and water-soluble copolymer.

11. An aqueous coating composition according to claim 1 wherein the particulate copolymer comprises copolymerised methacrylic acid, methyl methacrylate, butyl acrylate and methacrylamide.

12. An aqueous coating composition according to claim 1 wherein the composition comprises from 5 to 30 wt. % of solid material exclusive of any pigment.

13. A concentrated aqueous composition comprising a particulate copolymer as defined in claim 1 wherein the concentrate comprises from 30 to 50 wt. % of solid material exclusive of any pigment.

14. A composition according to claim 1 when neutralised by the presence of cations so as to have . a pH of at least 7.

15. An aqueous coating composition according to claim 1 wherein the copolymer is a copolymer of methacrylic acid, methyl methacrylate and butyl acrylate, and methacrylamide and the oligomer is methoxy poly(ethylene glycol) methacrylate.

16. An aqueous coating composition according to claim 15 wherein the particulate copolymer comprises:
7 to 12 wt. % methacrylic acid, 5 to 10 wt. % methacrylamide and balance methyl methacrylate and butyl acrylate, and the composition includes;
2 to 8 wt. % methoxy poly(ethylene glycol) methacrylate oligomer; and
below 5 wt. % organic solvent.

17. An aqueous coating composition suitable for use in the application of temporary coatings which composition comprises water and a dispersion of particulate water-insoluble copolymer which has a weight average molecular weight of 10,000 to 200,000 and which is a copolymer of:
i) acid monomers chosen from the group consisting of acrylic acid and methacrylic acid,
ii) methacrylamide; and
iii) a monomer other than those specified in (i) and (ii) which is a staple monomer which is copolymerizable with acrylic or methacrylic acid by free radical initiated copolymerization but does not confer water solubility on the particulate copolymer; and
chemically bonded to the particulate copolymer, an oligomer comprising a long chain hydrophilic moiety which moiety has a molecular weight of from 500 to 4,000 and a hydrophobic moiety through which the oligomer is bonded to the copolymer and wherein
a) based on the combined weights of copolymerized acrylic/methacrylic acid monomers, staple monomer and methacrylamide, the particulate copolymer comprises 7 to 14 wt. % of acrylic acid or methacrylic acid or the mixture of the two, 0.1 to 10 wt. % of hydrophilic monomer and the balance is staple monomer,
b) from 1 to 10 wt. % of the total weight of the particulate copolymer is oligomer and
c) the coating composition comprises not more than 5 wt. % of organic solvent based on the combined weight of water, organic solvent and particulate copolymer in the composition.

18. An aqueous coating composition as claimed in claim 17 wherein the staple monomers are chosen from the group consisting of $C_1$ to $C_{12}$ alkyl esters of unsaturated aliphatic carboxylic acids, vinyl esters of aliphatic acids and vinyl aromatic compounds.

19. An aqueous coating composition as claimed in claim 17 wherein the oligomer comprises hydrophilic moieties chosen from the group consisting of polyoxyethylene chains or poly(ethylene glycol) chains.

* * * * *